Patented July 1, 1947

2,423,234

UNITED STATES PATENT OFFICE 2,423,234

PREPARATION OF TETRAHYDROPHTHALIC ANHYDRIDES

Howard L. Gerhart and Leon M. Adams, Milwaukee, Wis., assignors to Pittsburgh Plate Glass Company, a corporation of Pennsylvania No Drawing. Application December 24, 1942, Serial No. 470,028

6 Claims. (Cl. 260—342.4)

The preparation of tetrahydrophthalic anhydrides, such as cis 3,6-endomethylene delta 4-tetrahydrophthalic anhydride by the reaction of an alpha beta ethylenic carboxylic acid anhydride and a diene hydrocarbon, such as monomeric cyclopentadiene has long been known. When these are brought together an addition reaction of the Diels-Alder type takes place immediately and the above-described product is obtained in quantitative yield as a white crystalline solid having a melting point of 164° C. Crystals are conveniently purified by dissolving them in naphtha and then recrystallizing them.

Heretofore this type of reaction has not been applicable to the polymer forms of cyclopentadiene, e. g., dicyclopentadiene, because dicyclopentadiene apparently does not contain a diene group and therefore would not enter into the Diels-Alder type reaction. In order to prepare the addendum product of cyclopentadiene and maleic anhydride or their homologues, it was necessary first to subject the dicyclopentadiene to a cracking operation, the efficiency of which was comparatively low and then to store the resultant cyclopentadiene at a low temperature, in order to prevent repolymerization to form the dicyclic compound.

It has now been found that tetrahydrophthalic anhydrides can be conveniently prepared by reaction between suitable diene hydrocarbons or polymers thereof capable of dissociation into their original monomers and maleic anhydride in a common solvent under pressure in an autoclave. Thus dicyclopentadiene may be induced to react with maleic anhydride in the presence of such common solvents as ordinary naphtha, glyceride oils, mono or diglycerides, fatty acids, and the like by carrying out the reaction under pressure at temperatures above the cracking temperature of dicyclopentadiene. In this manner excellent yields are obtained in a one-step process. Furthermore when the reaction is carried out in the presence of mono or diglycerides or fatty acids, the products may be converted directly into resinous compositions by heating under conditions commonly applied in the manufacture of alkyd resins.

The glycerides may be chosen from common oils such as soya bean oil, corn oil, linseed oil, dehydrated castor oil, and the like. Glycerides may be used as such or may be first converted to mono or diglycerides by heating with suitable quantities of glycerine. When the reaction is carried out in the presence of a diluent such as a naphtha, the product cis 3,6-endomethylene delta 4-tetrahydrophthalic anhydride is obtained by chilling the solvent, whereupon a purified crystalline material is obtained. The yield is essentially quantitative in contrast to the poor yields obtained in the two-step process wherein dicyclopentadiene is first cracked to its monomer cyclopentadiene.

The nature of the invention will be made more apparent by the following examples:

Example I

A charge consisting of—

| | Pounds |
|---|---|
| Alkali refined soy-bean oil | 16 |
| Maleic anhydride | 3 |
| Dicyclopentadiene | 2 | was heated to 200° C. in an autoclave and held for 30 minutes. The temperature was raised to 250° C. for three hours until a viscosity of 100 seconds was obtained. This vehicle was emulsified for use in an emulsion type paint.

Example II

This example illustrates how the anhydride can be made in the presence of a glyceride mixture. 1054 pounds of alkali refined linseed oil and 170 pounds of glycerol were heated to 232° C. for one hour in the presence of 0.3 pound litharge to effect a glycerolysis. The above glyceride mixture was charged in the autoclave with 80 pounds of dicyclopentadiene and 121 pounds of maleic anhydride, and heated for 60 minutes at 190° C. The resulting mixture of anhydride and glyceride was interesterified by heating at 210° C. under a strong passage of inert gas to an acid number of 39.3.

It is possible that the cyclopentadiene may to some extent react with the solvents above in the manner of the usual thermal non-catalytic co-polymerization. It is also possible that a part of the maleic anhydride may react with the glycerides as is well known. However, the reaction of the maleic anhydride with the monomeric cyclopentadiene takes place very rapidly in the temperature range 180 to 200° C. and the preponderating reaction is the formation of the new anhydride. In the examples given, it is not necessary to isolate the anhydride. The products can be condensed with glycerine or glycol, along with free fatty acids such as oleic acid, linseed oil acids or even oil, to provide alkyd type resins.

Example III

A complete alkyd resin charge was made in an autoclave as follows: A charge of linseed oil acids, glycerol, maleic anhydride and dicyclopentadiene was heated at 200° C. for one hour. The pressure was then released and the homogeneous mass was interesterified by blowing with inert gas at 210° C. until the acid number was reduced to 65. The charge for the autoclave consisted of the following:

| | Pounds |
|---|---|
| Linseed oil acids | 426 |
| Glycerine | 137.5 |
| Maleic anhydride | 141.5 |
| Dicyclopentadiene | 93.7 |

This charge was heated at 200° C. for 30 minutes, then heated under an inert atmosphere at 200° C. to an acid number of 65.4. In the example soybean oil acids or tung oil acids may be substituted for linseed oil acids.

Example IV

| | Grams |
|---|---|
| Petroleum naphtha | 400 |
| Maleic anhydride | 240 |
| Dicyclopentadiene | 176 |

The above mixture was heated in an autoclave at 200° C. for 35 minutes. The pressure reached a maximum value of 38 pounds per square inch. The average pressure was 30 pounds per square inch. The reaction product was a slurry of the tetrahydrophthalic anhydride in the naphtha. As the slurry cooled to room temperature, the crystals precipitated. The naphtha was decanted and the dry crystals were charged with glycerized oil to prepare an alkyd type resin in the well known manner.

The solvent is an essential component of the charge, since when it is omitted, the product is not the monomeric tetrahydrophthalic anhydride. Thus a charge consisting of 600 gm. maleic anhydride and 400 gm. dicyclopentadiene was heated in the absence of a solvent for 30 minutes at 200 to 210° C. The product was a brown partially resinified mass which did not dissolve completely in naphtha. It is evident that the solvent is necessary to produce the product desired.

The forms of the invention herein described are to be considered merely as exemplary and it will be apparent to those skilled in the art that numerous modifications may be made therein without departure from the spirit of the invention or the scope of the appended claims.

What we claim is:

1. A method of preparing cis-3,6-endomethylene, delta 4 tetrahydrophthalic anhydride, which comprises heating to a temperature of about 180 to 200° C. a mixture of dicyclopentadiene and maleic anhydride in a common inert organic solvent in an autoclave for about 30 to 60 minutes.

2. A process of preparing as a product cis-3,6-endomethylene, delta 4 tetrahydrophthalic anhydride, which comprises heating dicyclopentadiene and maleic anhydride dissolved in a glyceride oil under superatmospheric pressure to a temperature of about 180 to 200° C. for a period of about 30 minutes.

3. A process of preparing as a product cis-3,6-endomethylene, delta 4 tetrahydrophthalic anhydride, which comprises heating a solution of maleic anhydride and dicyclopentadiene in naphtha in a closed container to a temperature of about 200° C. to effect Diels-Alder reaction, then purifying the product by crystallizing it from the naphtha.

4. A method of preparing cis-3,6-endomethylene, delta 4 tetrahydrophthalic anhydride, which comprises heating to a temperature of about 180 to 200° C. in a closed system, a reaction mixture consisting essentially of dicyclopentadiene and maleic anhydride in a common inert organic solvent.

5. A method of preparing cis-3,6-endomethylene, delta 4 tetrahydrophthalic anhydride, which comprises heating to a temperature of about 180 to 200° C. and in a closed system a mixture consisting essentially of dicyclopentadiene and maleic anhydride dissolved in higher free fatty acids, the heating operation being continued for a period of about 30 to 60 minutes.

6. A process of preparing as a product cis-3,6-endomethylene, delta 4 tetrahydrophthalic anhydride, which comprises heating dicyclopentadiene and maleic anhydride dissolved in a glyceride of a higher fatty acid under superatmospheric pressures to a temperature of about 180 to 200° C. for a period of about 30 to 60 minutes.

HOWARD L. GERHART.
LEON M. ADAMS.

REFERENCES CITED

The following references are of record in the file of this patent:

UNITED STATES PATENTS

| Number | Name | Date |
|---|---|---|
| 2,264,429 | Bergmann | Dec. 2, 1941 |
| 2,251,297 | Soday | Aug. 5, 1941 |
| 2,104,956 | Stern | Jan. 11, 1938 |
| 1,944,731 | Diels & Alder | Jan. 23, 1934 |
| 2,347,970 | Rummelsburg | May 2, 1944 |
| 2,047,398 | Voss et al. | July 14, 1936 |
| 2,211,038 | Ward | Aug. 13, 1940 |
| 2,349,047 | Lycan et al. | May 16, 1944 |
| 2,319,826 | Pellett | May 25, 1943 |
| 2,235,447 | Bradley | Mar. 18, 1941 |

FOREIGN PATENTS

| Number | Country | Date |
|---|---|---|
| 598,732 | Germany | June 1934 |
| 468,542 | Great Britain | July 7, 1937 |

OTHER REFERENCES

Wilson, "Chemistry & Utilization of Cyclopentadiene," Chemical Reviews, Feb. 1944, vol. 34.